(12) United States Patent
Li et al.

(10) Patent No.: US 11,573,805 B2
(45) Date of Patent: Feb. 7, 2023

(54) IPMI OVER REDFISH

(71) Applicant: Dell Products L.P., Round Rock, TX (US)

(72) Inventors: Tianhe Li, Shanghai (CN); Kai Zhou, Shanghai (CN); Niannian Xia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 16/917,524

(22) Filed: Jun. 30, 2020

(65) Prior Publication Data
US 2021/0389955 A1    Dec. 16, 2021

(30) Foreign Application Priority Data

Jun. 15, 2020   (CN) .......................... 202010541748.8

(51) Int. Cl.
| G06F 9/00 | (2006.01) |
| G06F 9/4401 | (2018.01) |
| G06F 9/48 | (2006.01) |
| G06F 9/50 | (2006.01) |
| H04L 67/025 | (2022.01) |

(52) U.S. Cl.
CPC .......... *G06F 9/4401* (2013.01); *G06F 9/4806* (2013.01); *G06F 9/5005* (2013.01); *H04L 67/025* (2013.01); *G06F 9/4406* (2013.01)

(58) Field of Classification Search
CPC .... G06F 9/4401; G06F 9/4806; G06F 9/5005; G06F 67/25

USPC ............................................................ 713/2
See application file for complete search history.

(56) References Cited

U.S. PATENT DOCUMENTS

| | | | | |
|---|---|---|---|---|
| 8,069,257 | B1* | 11/2011 | Bhatia | .................. G06F 13/105 |
| | | | | 370/386 |
| 9,282,072 | B1* | 3/2016 | Tung | ..................... H04L 67/563 |
| 10,409,584 | B1* | 9/2019 | Kulchytskyy | ............. G06F 8/65 |
| 10,416,988 | B1* | 9/2019 | Kulchytskyy | ........... G06F 13/36 |
| 10,489,142 | B1* | 11/2019 | Podgorsky | ............. G06F 13/36 |
| 10,572,242 | B1* | 2/2020 | Santharam | ................ G06F 8/71 |
| 10,628,176 | B1* | 4/2020 | Santharam | ........... G06F 9/4401 |
| 10,649,792 | B1* | 5/2020 | Kulchytskyy | ............. G06F 8/65 |
| 11,256,314 | B2* | 2/2022 | Bartlett | ................. G06F 1/3287 |
| 2006/0129675 | A1* | 6/2006 | Zimmer | ............. H04L 67/1001 |
| | | | | 709/225 |

(Continued)

OTHER PUBLICATIONS

International Search Report and Written Opinion of the International Searching Authority, International Application No. PCT/US21/037259, dated Sep. 23, 2021.

(Continued)

*Primary Examiner* — Volvick Derose
(74) *Attorney, Agent, or Firm* — Jackson Walker L.L.P.

(57) ABSTRACT

An information handling system may include at least one processor; and a non-transitory memory coupled to the at least one processor. The information handling system may be configured to: receive a command associated with an Intelligent Platform Management Interface (IPMI) protocol; package the command for transmission according to a Redfish protocol; and transmit the packaged command to a Redfish interface of a management controller, wherein the management controller is configured to unpackage and execute the command.

18 Claims, 4 Drawing Sheets

(56) References Cited

U.S. PATENT DOCUMENTS

| | | | |
|---|---|---|---|
| 2014/0201301 A1* | 7/2014 | Bradley | G06F 8/65 709/208 |
| 2017/0242819 A1* | 8/2017 | Itkin | G06F 13/42 |
| 2019/0138377 A1* | 5/2019 | Lewis | G06F 9/547 |
| 2019/0227961 A1* | 7/2019 | Osawa | G06F 3/0632 |
| 2021/0141626 A1* | 5/2021 | Ladkani | G06F 3/0604 |
| 2022/0075963 A1* | 3/2022 | Renker | G06F 16/58 |

OTHER PUBLICATIONS

"Intel Management Module—Technical Product Specification," XP-002449694, Revision 1.0, Jun. 2005.

* cited by examiner

IPMI OVER REDFISH

TECHNICAL FIELD

The present disclosure relates in general to information handling systems, and more particularly to the management of server information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Intelligent Platform Management Interface (IPMI) is a technology that is commonly used for server management in the datacenter. The use of IPMI may involve Remote Management Control Protocol (RMCP) and/or RMCP+ for providing for IPMI over LAN. RCMP+ is a UDP-based protocol which, although providing stronger authentication than RMCP, still may not provide sufficient communication security mechanisms for many enterprise applications.

Redfish is a standard designed to deliver simple and secure management functionality and is particularly suited for use in converged, hybrid IT and the Software Defined Data Center (SDDC). To protect both the interface and the exchanged data, Redfish provides authentication and encryption. Redfish is largely replacing IPMI for server management over the network in modern datacenter environments.

However, many server components have not yet implemented the Redfish API. Such components typically still leverage IPMI for server management.

Accordingly, it would be advantageous to be able to the security benefits of Redfish even on components that do not yet implement the Redfish API.

It is to be noted that various elements discussed herein are described in the Intelligent Platform Management Interface (IPMI) Specification Second Generation v2.0, Revision 1.1, released Oct. 1, 2013 (hereinafter, IPMI Specification), which is hereby incorporated by reference in its entirety. One of ordinary skill in the art with the benefit of this disclosure will understand its applicability to other specifications (e.g., prior or successor versions of the IPMI Specification). Further, some embodiments may be applicable to different technologies other than IPMI.

It is to be further noted that various elements discussed herein are described in the Redfish Specification 1.9.1, released Apr. 15, 2020 (hereinafter, Redfish Specification), which is also incorporated by reference in its entirety. One of ordinary skill in the art with the benefit of this disclosure will understand its applicability to other specifications (e.g., prior or successor versions of the Redfish Specification). Further, some embodiments may be applicable to different technologies other than Redfish.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of server information handling systems may be reduced or eliminated.

In accordance with embodiments of the present disclosure, an information handling system may include at least one processor; and a non-transitory memory coupled to the at least one processor. The information handling system may be configured to: receive a command associated with an Intelligent Platform Management Interface (IPMI) protocol; package the command for transmission according to a Redfish protocol; and transmit the packaged command to a Redfish interface of a management controller, wherein the management controller is configured to unpackage and execute the command.

In accordance with these and other embodiments of the present disclosure, a management controller configured to provide out-of-band management of an information handling system may be further configured to: receive a transmission from a management console, wherein the transmission is received via a Redfish interface of the management controller, and wherein the transmission includes a packaged version of a command associated with an Intelligent Platform Management Interface (IPMI) protocol; unpackage the command; and execute the command.

In accordance with these and other embodiments of the present disclosure, methods and articles of manufacture including non-transitory, computer-readable media having computer-executable code thereon may also be provided.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
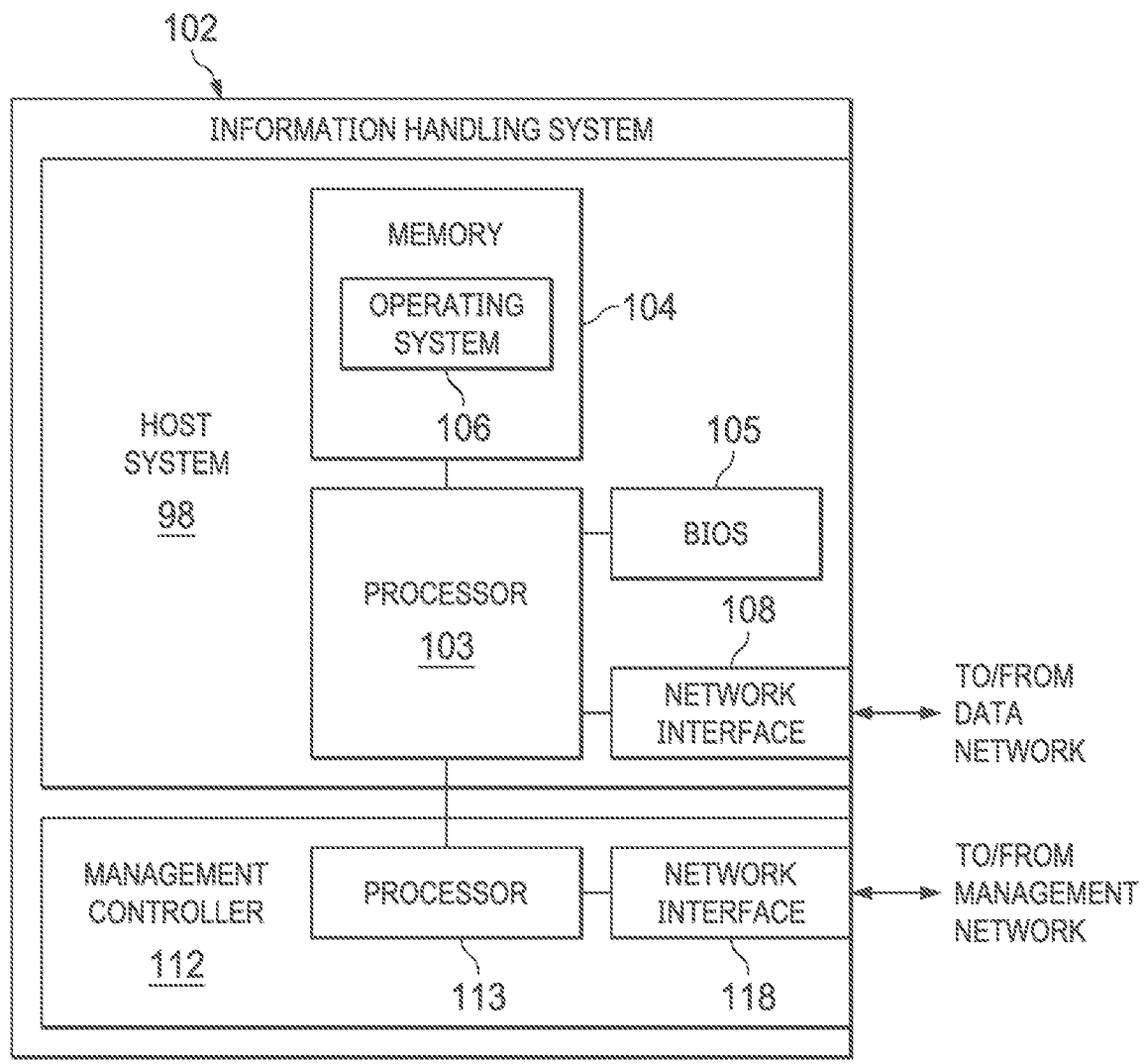
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be advantageous to be able to combine the security features of Redfish with the ubiquity of IPMI in managing server information handling systems. Embodiments of this disclosure may thus take advantage of Redfish and extend the Redfish API to support IPMI. In some embodiments, this may be accomplished via components such as a package mechanism, a transfer mechanism, and a process mechanism.

The package mechanism may provide the ability to package and encode one or more IPMI commands into an HTTP request. The transfer mechanism may include a new Redfish API in a management controller such as a BMC to provide the ability for the management controller to process Redfish requests for IPMI and generate HTTP responses. The process mechanism may provide a task service and an IPMI service in the management controller to create IPMI tasks, execute IPMI commands, and store the IPMI responses.

Accordingly, embodiments of this disclosure may provide a mechanism to package and encode IPMI command(s) to allow such IPMI commands to be conveyed via Redfish. Embodiments may also provide the ability to execute multiple IPMI commands in one Redfish request, as well as a mechanism for IPMI command serialization for out-of-order IPMI execution of such groups of multiple IPMI commands.

Such techniques may provide many advantages, including enhancing the security of IPMI by leveraging the advantages of Redfish. Further, it may be possible to disable the IPMI-over-LAN functionality to increase security, while still using existing IPMI commands/scripts (e.g., without modifications or with minor modifications), reducing the required development efforts for transitioning server management to support Redfish.

Figure 2:
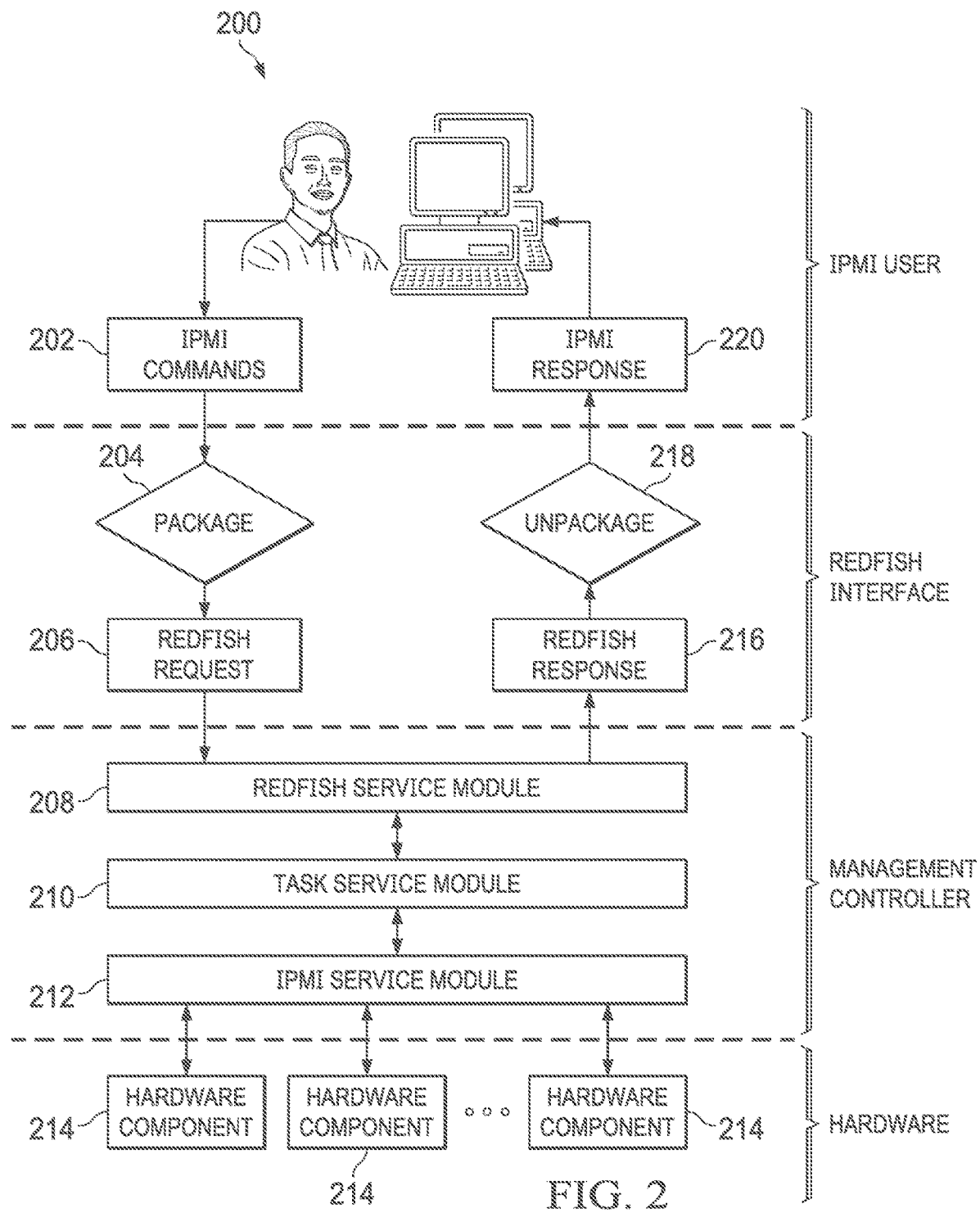
FIG. 2 illustrates an example method for enabling IPMI commands over Redfish, in accordance with embodiments of the present disclosure.

Turning now to FIG. 2, a flow chart is shown of an example method 200 for implementing IPMI over Redfish. At step 202, a user (e.g., an IPMI user operating a management console) may transmit one or more IPMI commands. At step 204, a Redfish interface (e.g., at the management console) receives the commands and packages them for transmission via Redfish. For example, if more than one IPMI command is present, such multiple IPMI commands may be combined, with one line per each IPMI command. The commands may then be Base64 encoded and put into an HTTP body. An HTTP POST request may then be generated at step 206 with the Redfish API implemented in the transfer mechanism discussed below, and the HTTP body may be passed to a Redfish service module of the management controller (e.g., a BMC) at step 208.

To enable the transfer mechanism mentioned above, the management controller may implement a Redfish REST API (discussed in further detail below at Table 1) in the Redfish service module 208. This API may process HTTP requests for IPMI, and call a task service module 210 to create IPMI tasks and save any resulting useful data. In some embodiments, a TaskId (e.g., a numeric value usable as a task identifier) associated with each task may be included in an HTTP response body and then returned to the Redfish API caller. The Redfish API caller may be able to read the task status by calling the task service with a TaskId, then decoding/unpackaging the HTTP response to get the IPMI response. (An example of response data is shown below at Table 2.)

The process mechanism mentioned above may be implemented via an IPMI service module 212 of the management controller. The task service may read the IPMI task from a database and dispatch the task to the IPMI service module 212. The IPMI service module 212 may handle executing the IPMI commands against various hardware components 214.

For example, IPMI service module 212 may read the IPMI task and unpackage/decode the contents of the task to get the IPMI commands. The IPMI commands may also be serialized. The IPMI service module 212 may check the target hardware component 214 that each IPMI command is to be executed on, and the IPMI commands may then be executed in order for each component.

Threads may be created (e.g., one thread for each hardware component) to execute the IPMI commands on the various hardware components. IPMI service module 212 may monitor all the threads, receive results from each thread, and save the results. Each thread may execute IPMI commands and return the IPMI response results to IPMI service module 212.

After completion, Redfish service module 208 may pass the results of the commands back to the caller via a Redfish response 216. Such results may be packaged in a manner similar to or different from the packaging that takes place at step 204. The results may then be unpackaged at step 218, and an IPMI response may be returned to the user at step 220.

Figure 3:
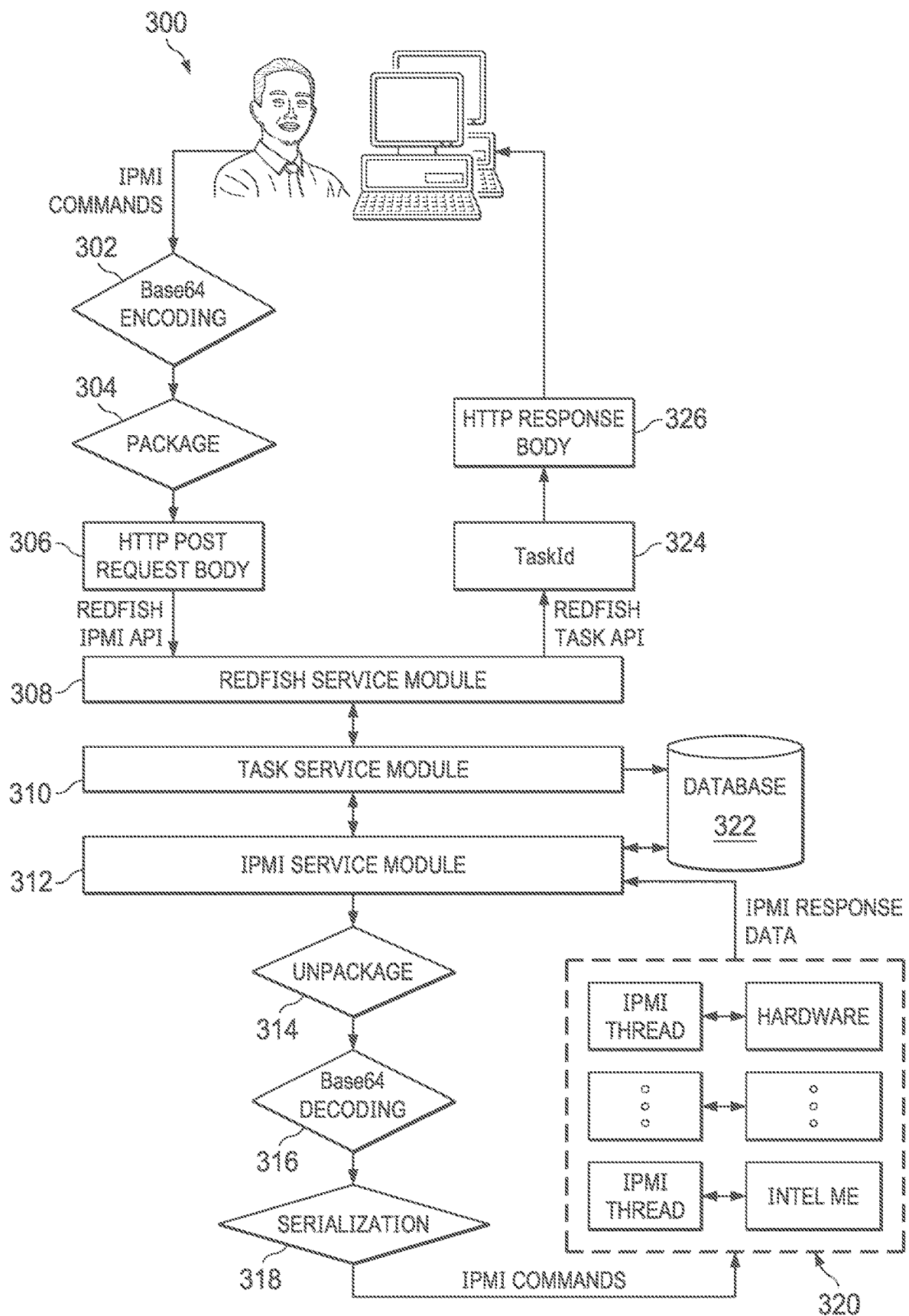
FIG. 3 illustrates an example method for sending an IPMI command over Redfish, in accordance with embodiments of the present disclosure.

Turning now to FIG. 3, a flow chart is shown of an example method 300 for a Redfish user sending IPMI commands over the Redfish API. At step 302, a user may select one or more IPMI commands for execution. These may be encoded into Base64 or any other suitable encoding at step 302 and packaged (e.g., as described above) at step 304.

At step 306, an HTTP POST request body is generated including the Base64 encoded IPMI commands, which is then transmitted via the Redfish IPMI API to the Redfish service module 308. As described above, Redfish service module 308, task service module 310, and IPMI service module 312 may handle the transferring and processing of the IPMI commands, with the help of database 322.

IPMI commands may be unpackaged at step 314, Base64 decoded at step 316, and serialized at step 318. The commands may then be executed by threads running on various hardware components at step 320.

Any response data may be returned to the IPMI service module 312, stored in database 322, and made available to the user based on a TaskID identifier 324 via an HTTP response body at step 326.

Figure 4:
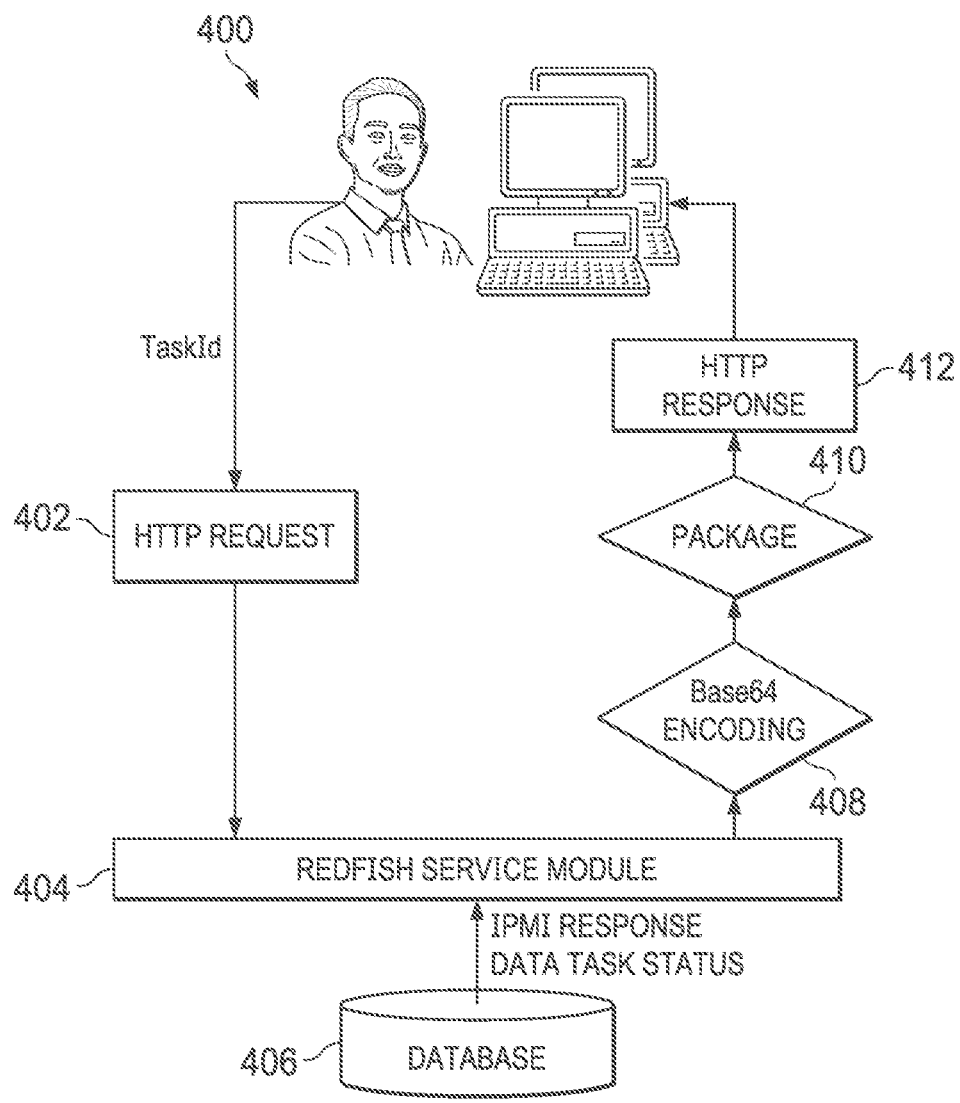
FIG. 4 illustrates an example method for receiving a result of an IPMI command over Redfish, in accordance with embodiments of the present disclosure.

Turning now to FIG. 4, a flow chart is shown of an example method 400 for a Redfish user calling a Redfish task API with a TaskID to receive task results. For example, the user may have previously requested execution of an IPMI command and received the TaskID in response. At some subsequent time at step 402, the user sends an HTTP request including the TaskID identifying the IPMI task for which results are desired. At step 404, the Redfish service module may query database 406 (which may be the same as or similar to database 322 from FIG. 3) to receive the IPMI response data and/or task status.

The results may then be Base64 encoded at step 408, packaged at step 410, and returned to the user in an HTTP response at step 412.

As noted above, Table 1 shows an example of a Redfish API IPMIService. As shown, "TaskID" is a numeric number associated with a particular task.

TABLE 1

| | Redfish API: IPMIService |
|---|---|
| Description | The IPMIService API method is used to send IPMI commands |
| URL | /redfish/v1/OEM/IPMIService/IPMI |
| Supported HTTP Method | POST |
| Privileges | ConfigureManager |
| Parameters | {<br>  'OperationType': 'IPMI Protocol',<br>  'OperationDataEncoding': 'Base64'<br>  'OperationData': 'ZnJ1IHByaW50IDA='<br>} |
| HTTP status code | 200 Success<br>400 ValueTypeError<br>403 InsufficientPrivilege<br>500 InternalError<br>501 IPMI Service is not available<br>502 Invalid IPMI command |
| Response | {<br>  "TaskId": 545<br>} |

Table 2 below shows an example of a set of response data.

TABLE 2

| | Redfish API: TaskService/Tasks/{TaskId} |
|---|---|
| Description | The TaskService API method is used to retrieve the task status |
| URL | /redfish/v1/TaskService/Tasks/{TaskId} |
| Supported HTTP Method | Get |
| Privileges | ConfigureManager |
| HTTP status code | 200 Success<br>403 InsufficientPrivilege<br>500 InternalError |
| Response | "@odata.type" : "#TaskService.v1_3_0.Task",<br>"Id": "545",<br>"Name": "Task 545",<br>"TaskMonitor": "/taskmon/545",<br>"TaskState": "Completed",<br>"StartTime": "2021-09-30T14:55+06:00",<br>"EndTime": "2021-09-30T14:59+06:00",<br>"TaskStatus": "OK",<br>"Messages": [<br>  {<br>    "MessageId": "Base.1.0.IPMI_Response",<br>    "OperationType": 'IPMI Protocol',<br>    "OperationDataEncoding": 'Base64',<br>    "OperationData": "XXXXX"<br>  }<br>],<br>"@odata.context":<br>"/redfish/v1/$metadata$Task.Task",<br>"@odata.id":<br>"/redfish/v1/TaskService/Tasks/545" |

"OperationData" would typically be a Base64 encoded string, which is omitted from Table 2 for the sake of brevity. One of ordinary skill in the art with the benefit of this disclosure will appreciate that various other types of responses could be implanted in other embodiments as desired.

One of ordinary skill in the art with the benefit of this disclosure will understand that the preferred initialization point for the methods depicted in FIGS. 2-4 and the order of the steps comprising those methods may depend on the implementation chosen. In these and other embodiments, this method may be implemented as hardware, firmware, software, applications, functions, libraries, or other instructions. Further, although FIGS. 2-4 disclose a particular number of steps to be taken with respect to the disclosed methods, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   receive a command associated with an Intelligent Platform Management Interface (IPMI) protocol;
   package the command for transmission according to a Redfish protocol; and
   transmit the packaged command to a Redfish interface of a management controller, wherein the management controller is configured to unpackage the command and execute the command on an information handling resource that does not implement a Redfish interface.

2. The information handling system of claim 1, wherein packaging the command includes performing Base64 encoding of the command.

3. The information handling system of claim 2, wherein packaging the command further includes generating an HTTP POST command comprising the Base64 encoding of the command.

4. The information handling system of claim 1, wherein the management controller is further configured to receive a result of the executed command and store the received result in a database.

5. The information handling system of claim 4, wherein the information handling system is configured to send a subsequent query to the management controller, the subsequent query identifying the command via a task identifier.

6. The information handling system of claim 5, wherein the management controller is further configured to, in response to the subsequent query, retrieve the result from the database and transmit the result to the information handling system.

7. The information handling system of claim 6, wherein the management controller is further configured to transmit the result to the information handling system via the Redfish protocol.

8. The information handling system of claim 1, wherein the information handling system is further configured to:
   receive a plurality of commands associated with the IPMI protocol; and
   package the plurality of commands for transmission as a single HTTP POST command according to the Redfish protocol.

9. The information handling system of claim 1, wherein the management controller is a baseboard management controller (BMC).

10. A management controller comprising a management controller processor, the management controller configured to provide out-of-band management of an information handling system, the management controller further configured to:
    receive a transmission from a management console, wherein the transmission is received via a Redfish interface of the management controller, and wherein the transmission includes a packaged version of a command associated with an Intelligent Platform Management Interface (IPMI) protocol;
    unpackage the command; and
    execute the command on an information handling resource that does not implement a Redfish interface.

11. The management controller of claim 10, wherein the packaged version of the command includes a Base64 encoded version of the command.

12. The management controller of claim 11, wherein the packaged version of the command includes an HTTP POST command comprising the Base64 encoded version of the command.

13. The management controller of claim 10, further configured to receive a result of the executed command and store the received result in a database.

14. The management controller of claim 13, further configured to receive a subsequent query identifying the command via a task identifier.

15. The management controller of claim 14, further configured to, in response to the subsequent query, retrieve the result from the database and transmit the result to the management console.

16. The management controller of claim 15, further configured to transmit the result to the management console via the Redfish protocol.

17. The management controller of claim 10, further configured to receive a plurality of commands associated with the IPMI protocol, wherein the plurality of commands are packaged as a single HTTP POST command according to the Redfish protocol.

18. The management controller of claim 10, wherein the management controller is a baseboard management controller (BMC).

* * * * *